Patented Nov. 13, 1928.

1,691,755

UNITED STATES PATENT OFFICE.

HENRY F. BUTTNER, OF KELLOGG, IDAHO.

DENTAL PLATE AND PROCESS FOR PLATING SAME.

No Drawing.   Application filed July 5, 1927.   Serial No. 203,690.

The present invention relates to a dental plate and to a process for coating the same with metals such as silver, gold or platinum, and has among its objects the production of a rubber, vulcanized rubber, vulcanite or similar plate carrying artificial teeth which is coated with either or any of the aforesaid or other suitable metals, whereby plates of the character mentioned are rendered healthy to the tissues of the mouth, preventing what is known as scald mouth.

Heretofore an attempt was made to coat vulcanite or similar plates with a metal such as gold, silver, platinum or tin using first a solvent for the vulcanite to prepare the vulcanite for receiving the metal coating. The action which was alleged to take place was the softening of the vulcanite so that it could be permeated as well as coated by the metal which was subsequently deposited upon it from a solution of the coating metal. Such softening of the vulcanite or similar material I find to be objectionable because after the softening action and the subsequent metal coating there is produced an objectionable property in the rubber or vulcanite plate. This objectionable property consists in that the softened rubber with its metal coating peels or rots off. This peeling or rotting seems to be due largely to the action of the solvent chemicals used in softening the vulcanite.

Now the present invention does away entirely with this peeling or rotting away action and the practice of the process is performed without the use of any solvent for vulcanite or rubber. A vulcanite or similar plate is produced by the present invention on which the metal is directly attached as a coating upon the surface of the vulcanite preserving all the original properties of the vulcanite which existed therein prior to the coating operation. The union between the rubber or vulcanite surface and the metal is perfect from a mechanical as well as a sanitary standpoint. It is preferable to first coat the plate surface on the parts to be adjacent to the gums, and such other parts as desired, with silver and thereafter with gold or platinum, the latter being deposited by any suitable known process as by electrodeposition. The deposition of the silver, however, must take place in accordance with the particular process herein described if the results heretofore mentioned are to be obtained. Unless this preliminary deposition takes place as herein described, the metal, for example, the silver, will not be deposited in a form which will resist the solvent action of the cyanide bath used in electroplating the plate, and for this reason there is required the two step immersion treatment described below.

In practicing the present invention a solution for depositions of silver is first prepared. This is prepared as follows: To one ounce of distilled water add 24 grains of silver nitrate and agitate the mixture until a solution is formed; then add an aqua ammonia solution of 26% ammonia until the precipitate which is formed is redissolved. To this ammoniacal silver nitrate solution is then added a solution formed of one-third ounce of distilled water and 24 grains of caustic potash or caustic soda in stick form. When the caustic alkali solution is added to the ammoniacal silver nitrate solution a heavy precipitate is formed which should be redissolved by the addition of aqua ammonia of preferably 26% strength.

The dental or other vulcanite plate to be coated, imbedded or not, in a set composition of one part pumice powder to two parts dental plaster is exposed to the action of the above silver solution, for example submerging the plate in the solution contained in a suitable vessel.

In order to cause the silver to be precipitated upon the vulcanite or rubber surface use is to be made of the following composition:

1½ ounces of distilled water.
30 grains of granulated sugar.
4 drops of nitric acid.
30 drops of grain (ethyl) alcohol.

This mixture of ingredients is brought to a boil and then added to the above described silver solution to which the plate is exposed. The mixture is allowed to stand about fifteen minutes in order to obtain the metal coating herein described. The plate is then removed and washed with clean water and is ready to be treated by the second step of the process described in the following paragraph.

The silver plate thus coated is now treated with a solution of 60 grains of nitrate of silver in 3 ounces of distilled water by pouring it, after bringing it to the boiling point, upon the plate which should be submerged therein; and thereafter 10 grains of gallic acid are added. The resulting reaction mixture should be allowed to remain on the plate about 10 minutes and is agitated during this period from time to time with a glass spatula. The plate is then cleaned with a solution of sodium carbonate and a brush. The silver coating is substantially permanent and may be polished and handled without fear of rubbing it off. The silver coating is firmly and rigidly attached to the vulcanite and forms a suitable and excellent base for applying other metals as gold or platinum by electrodeposition or in any other suitable manner.

Having described my invention what I claim is:

The process of coating a surface of vulcanized rubber with metal which comprises first subjecting the surface to the combined action of an ammoniacal silver nitrate solution and an aqueous solution containing sugar, alcohol and a small proportion of nitric acid, and thereafter subjecting the so treated surface to the combined action of a silver nitrate solution and gallic acid.

In testimony whereof I affix my signature.

HENRY F. BUTTNER.